(12) United States Patent
Dutta et al.

(10) Patent No.: US 11,683,553 B2
(45) Date of Patent: Jun. 20, 2023

(54) METHODS AND SYSTEMS FOR GROUP WATCHING (71) Applicant: Rovi Guides, Inc., San Jose, CA (US)

(72) Inventors: Rupayan Dutta, Pin (IN); Vishwas Sharadanagar Panchaksharaiah, Karnataka (IN); Vikram Makam Gupta, Karnataka (IN); Sukanya Agarwal, Haryana (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/514,022

(22) Filed: Oct. 29, 2021

(65) Prior Publication Data
US 2023/0138329 A1   May 4, 2023

(51) Int. Cl.
*H04N 21/43* (2011.01)
*H04N 21/458* (2011.01)
*H04N 21/45* (2011.01)
*H04N 21/4415* (2011.01)
*H04N 21/6587* (2011.01)

(52) U.S. Cl.
CPC ... *H04N 21/43076* (2020.08); *H04N 21/4415* (2013.01); *H04N 21/458* (2013.01); *H04N 21/4532* (2013.01); *H04N 21/6587* (2013.01)

(58) Field of Classification Search
None
See application file for complete search history.

(56) References Cited

U.S. PATENT DOCUMENTS

| | | | | |
|---|---|---|---|---|
| 8,346,067 | B2* | 1/2013 | Issa | H04N 21/47217 386/343 |
| 8,811,805 | B2* | 8/2014 | Issa | H04N 21/47217 386/343 |
| 9,159,361 | B2* | 10/2015 | Issa | H04N 21/84 |
| 11,206,443 | B2* | 12/2021 | Barvo | H04N 21/2187 |
| 2010/0050202 | A1* | 2/2010 | Kandekar | H04L 67/535 725/14 |
| 2010/0202761 | A1* | 8/2010 | Bhogal | H04N 21/4788 386/241 |
| 2010/0212001 | A1* | 8/2010 | Kashyap | H04N 21/42204 726/7 |
| 2011/0239253 | A1* | 9/2011 | West | H04N 21/25891 725/46 |
| 2012/0039578 | A1* | 2/2012 | Issa | H04N 21/84 725/109 |

(Continued)

*Primary Examiner* — William J Kim
(74) *Attorney, Agent, or Firm* — Haley Guiliano LLP (57) ABSTRACT

A method of modifying playing of media content in a group watch session comprises receiving a command to modify play; determining respective preferences of respective users in the session; and, if it is determined that execution of the command is consistent with the preferences, causing modifying of the playing of at least a portion of the media content based on the received command, e.g., by skipping the portion, jumping to another play position, or rewinding or fast-forwarding through the portion. In this manner, the command is executed, or not executed, based on the preferences of multiple users. The method may include estimating a satisfaction score for the command for the respective users, and comparing the estimated satisfaction scores with a reference score. The portion(s) of the media content for which play is modified may be determined based on the estimated satisfaction scores.

18 Claims, 5 Drawing Sheets

(56) References Cited

U.S. PATENT DOCUMENTS

| | | | |
|---|---|---|---|
| 2012/0117488 A1* | 5/2012 | Amidon | H04N 21/4622 715/753 |
| 2012/0240144 A1* | 9/2012 | Rose | H04N 21/2668 725/35 |
| 2013/0125153 A1* | 5/2013 | Hilson | H04N 21/2393 725/32 |
| 2013/0152129 A1* | 6/2013 | Alberth | H04N 21/4312 725/47 |
| 2013/0223821 A1* | 8/2013 | Issa | H04N 5/783 386/343 |
| 2014/0123160 A1* | 5/2014 | van Coppenolle | H04N 21/4314 725/25 |
| 2014/0255004 A1* | 9/2014 | Allen | H04N 21/4756 386/241 |
| 2015/0023654 A1* | 1/2015 | Issa | H04N 5/783 386/343 |
| 2016/0029055 A1* | 1/2016 | Villegas Nunez | H04N 21/251 725/14 |
| 2018/0270516 A1* | 9/2018 | Dalbec | H04N 21/4622 |
| 2019/0222803 A1* | 7/2019 | Pather | H04N 21/4781 |
| 2020/0099962 A1* | 3/2020 | Saba | G06Q 50/00 |
| 2020/0099979 A1* | 3/2020 | Panchaksharaiah | H04N 21/44004 |
| 2021/0352359 A1* | 11/2021 | Barvo | H04N 21/43076 |
| 2022/0248080 A1* | 8/2022 | Strickland | H04N 21/252 |
| 2022/0295131 A1* | 9/2022 | Shah | H04N 21/8456 |

\* cited by examiner

METHODS AND SYSTEMS FOR GROUP WATCHING

FIELD

The present disclosure is directed to methods and systems for group watching, and, more particularly, to methods and systems for providing media content to a group of users.

BACKGROUND

Consumption of media content in home environments has been increasing. This rise has been driven, in part, by increases in the number of channels available through broadcast, cable and satellite systems and in the number of streaming services. Traditionally, a group of viewers consumes content together by gathering in the same physical location and watching the content on the same television, or other user device. In recent years, groups of viewers have been able to gather together in an online session to view content, for example, using a screen-sharing function in a videocall application, a videoconference application, or a group watch application, regardless of their respective locations. Such applications also allow a group to include multiple viewers at the same physical location and viewers in remote locations, in a combination of these two approaches.

In a group watching activity, at least some degree of synchronization between the playback of the content on the devices used by the viewers to view the content is provided, for example, using a group watch application implemented on the viewers' respective media devices. In particular, playback operations instigated by one or more of the viewers, such as pausing, rewinding, fast-forwarding or skipping content, is replicated in playback of the content to the other viewers in the group. However, a playback operation performed by one of the viewers might be inconsistent with the preferences of other users in the group. For example, one viewer might rewind the content to replay a particular scene that other viewers do not wish to watch again. In another example, one viewer might skip a segment of the content that another viewer wants to view.

SUMMARY

According to an aspect, there is provided a method of modifying playing of media content, comprising identifying a plurality of users participating in a group watch session; receiving, from a user equipment device associated with one of the users, a command to modify playing of the media content; determining user preferences of respective ones of the users; determining, using the control circuitry, whether execution of the command is consistent with the user preferences of each of the respective users; and, in response to determining that execution of the command is consistent with the user preferences, causing modifying of the playing of at least a portion of the media content based on the received command.

Modifying of the playing of the portion of the media content may be caused by transmitting a message, or instruction, based on the command to one or more user devices or servers participating in the group watch session. Examples of such modifying may include one or more of skipping the portion of the media content, jumping to a particular play position in the media content, rewinding at least the portion of the media content, fast-forwarding at least the portion of the media content, changing to other media content, or, where the group watch session is viewing broadcast content, changing a channel being viewed.

The method allows for control of playback operations on the media asset that takes into account the preferences of other users in the group watch session. For example, the group of users may be watching a recording of a movie that is interrupted by a news segment, using a media player application. If one user inputs a command to skip the news segment, the media player application may determine whether the command should be executed, based on whether the command is consistent with the preferences of the other users in the group. The command is then executed if it is determined that it is consistent with the preferences of the users in the group. Where a majority of the other users have preferences for viewing news content, however, the command might not be executed.

In another example, a command may be received to skip a number of segments of the media content, either to avoid playing of segments that a user is not interested in or to fit the viewing of the media content into a shorter time duration. In such an example, the media player application may select segments to skip based on the user preferences, such as commercial breaks, musical segments, and violent scenes, so that the selection takes into account the preferences of other group members.

The method includes identifying the users in the group watch session, so that information indicating their user preferences can be obtained. For example, user profile information for the identified users may be retrieved and the user preferences determined based on the information in the user profiles. A user in the plurality of users may be identified by one or more techniques, such as facial recognition on a captured image of one or more of the users; voice recognition on a captured audio sample of the user's voice; obtaining login information identifying the user, for example, when logging in to a media player application, videoconference application or videocall application; or obtaining information from a user device associated with the user that identifies the user and/or the user device. For example, the user may provide identification information by tapping a device associated with them, such as their smartphone or smartwatch, or a card or fob containing a suitable tag, on a near-field communication reader.

The determination of whether execution of the command is consistent with the user preferences may include estimating, for each of the respective users, a satisfaction score for the command based on the user preferences. The estimated satisfaction score for each user may be estimated based on relevant user preferences in their user profile. For example, where the command is a command to skip a news segment, a satisfaction score for each user may be estimated based on any user preferences relating to news content. For example, if a user often skips news programs, or changes channel or stops viewing when a new program starts, then this may be reflected in a specific user preference and/or viewing history information in that user's profile. A lower satisfaction score for the skip command may be estimated for a user that has a preference for news programs, relative to a satisfaction score estimated for a user that tends to switch off news programs. In another example, a user profile might indicate that a particular user is hard of hearing, in which case a command to jump back to a segment of the media content with low-volume dialogue or dialogue that was difficult to distinguish from background sounds in the media content might be associated with a high estimated satisfaction score for that user, when compared with the estimated satisfaction score for other users in the group.

Optionally, the estimated satisfaction score may reflect a strength or weight associated with those user preferences or with the user themselves. For example, an estimated satisfaction score for a user that exhibits a strong dislike of a particular genre of content may be lower than an estimated satisfaction score for a user that appears to have a less intense dislike of that genre. Similarly, an estimated satisfaction score for an operation to replay a segment with low-volume dialogue may be higher for a user that is hard of hearing when compared with the estimated satisfaction score for another user.

The estimated satisfaction scores are compared with a reference satisfaction score. If each of the estimated satisfaction scores meets a condition based on the reference satisfaction score, then it is determined that execution of the command is consistent with the respective user preferences. The playing of the media content is then modified, based on the command. For example, if it is determined that each of the estimated satisfaction scores meets, or exceeds, the reference satisfaction score, then the command may be executed.

If it is determined that one or more estimated satisfaction scores do not meet the condition based on the reference satisfaction score, then a value of the reference satisfaction score may be adjusted, and estimated satisfaction scores may be compared with the adjusted reference satisfaction score. For example, an adjustment may reduce the value of the reference satisfaction score, to increase the likelihood of the command meeting the condition. For instance, the command may involve the media player application automatically selecting a number of segments of the media content to rewind, fast-forward, or skip, and might not identify a combination of segments for which all of the estimated satisfaction scores associated with skipping those segments are greater than, or equal to, the reference satisfaction score, based, for example, on newly estimated satisfaction scores for one or more alternative combinations of segments. To assist in finding a selection of segments for skipping that takes account of the preferences of multiple users in the group, the value of the reference satisfaction score may be reduced, to allow the media player application to identify a combination of segments for which the estimated satisfaction scores would meet, or exceed, the adjusted reference satisfaction score.

Additionally, or alternatively, in response to determining that execution of the command is not consistent with the user preferences, a parameter corresponding to one or more portions of the media content that would be affected by the execution of the command may be adjusted. Continuing with the above example, if the estimated satisfaction scores for one or more combinations of a particular number of segments for skipping do not meet the condition, then the media player application may provide new estimated satisfaction scores for combinations of a different number of segments.

In yet another example, the estimated satisfaction scores of some users may take precedence over others. For instance, the estimated satisfaction scores of adult users may take precedence over the estimate satisfaction scores of their children. In that example, it may be determined that execution of the command is consistent with the respective user preferences if the respective estimated satisfaction scores of the adult users meets the condition, even if the respective estimated satisfaction scores of the children do not.

The reference value and/or any of the parameters may be adjusted more than once, when determining whether the condition is met. In some embodiments, if the condition cannot be met, either based on initial estimated satisfaction scores or after making one or more adjustments discussed above, then the command may be executed based on the preferences of the majority of the users, without the condition being met. For example, if the reference satisfaction score is reduced to a value below a predetermined threshold, then the command may be executed by skipping segments of the media content based on the preferences of the majority of the users in the group or, alternatively, based on the preferences of particular users in the group.

In yet another example, one or more portions of other media content may be included in the group watch session, for example, to enhance the estimated satisfaction scores for the respective users. For example, if an episode of a series is being played in the group watch session and a number of segments are being skipped, portions of later episodes may be displayed in the group watch session to allow the condition to be met while maintaining a degree of continuity of content.

In a further example, where the users in the group are at different physical locations, different content may be provided to some of the users in the group watch session. For example, if a subset of the users have a user preference for replaying segments with low-volume dialogue, then those segments may be replayed to that subset of users, while different content, such as a highlights video clip or preview video clip, is provided to the other users in the group watch session. The playing of different content to different users in this manner can be used, in particular, to resolve a situation in which only some of the estimated satisfaction scores meet the condition.

Where the discussion above relates to selection of a particular number of segments for which playing is to be modified, the method may, instead, select a number of segments based on a particular duration of media content to be skipped, replayed or subjected to fast playback.

The media content may be, for example, audio content, or multimedia content including both audio content and video content.

According to another aspect, there is provided a non-transitory computer-readable medium, on which is stored computer-readable instructions to perform any of the methods set out in the above aspect.

According to yet another aspect, there is provided an apparatus comprising control circuitry configured to identify multiple users participating in a group watch session; receive, from a user equipment device associated with one of the users, a command to modify playing of the media content; determine user preferences of respective ones of the users; determine whether execution of the command is consistent with the user preferences of each of the respective users; and, in response to determining that execution of the command is consistent with the user preferences, cause modification of the playing of at least a portion of the media content based on the received command.

The control circuitry may be further configured to identify a user in the group watch session by one or more of facial recognition on a captured image of the user, voice recognition on a captured audio sample of the user's voice, obtaining login information identifying the user, and obtaining identification information from a user device associated with the user. For example, the apparatus may include, or be connected to, a camera that can capture an image of the user for facial recognition purposes. Alternatively, or additionally, the apparatus may include a microphone for capturing an audio sample and/or receive an audio sample from another device such as a smart speaker for use in voice recognition. The user may be identified using login information, for example, when logging in to a media player application or when joining the group watch session. In another example, a user may be identified using information about the user, or about a device associated with the user, received by the apparatus. For example, the apparatus may include, or receive information from, a device such as a near field communication reader. In such an example, a user may tap their cellphone, smartwatch or other user device on the reader to provide the identification information.

The control circuitry may be configured to determine whether execution of the command is consistent with the user preferences by estimating, for each of the respective users, a satisfaction score for the command based on the user preferences, comparing the estimated satisfaction scores with a reference satisfaction score, and determining that the execution of the command is consistent with the user preferences based on the estimated satisfaction scores meeting a condition based on the reference satisfaction score. For example, the condition may be considered to be met when each of the estimated satisfaction scores meets or exceeds the reference satisfaction score.

The control circuitry may be configured to adjust a value of the reference satisfaction score in response to determining that execution of the command is not consistent with the user preferences; compare the estimated satisfaction scores with the adjusted reference satisfaction score; and, in response to determining that the estimated satisfaction scores meets a condition based on the adjusted reference satisfaction score, determine that the execution of the command is consistent with the user preferences.

The control circuitry may be configured to adjust a parameter corresponding to a duration of the media content that will be affected by the execution of the command or to a number of portions of the media content that will be affected by execution of the command, in response to determining that execution of the command is not consistent with the user preferences. The control circuitry can then update the estimated satisfaction score for each of the respective users based on the user preferences and the adjusted parameter, compare the updated satisfaction scores with the reference satisfaction score, and, in response to determining that each of the updated satisfaction scores meet a condition based on the reference satisfaction score, determine that the execution of the command based on the adjusted parameter is consistent with the user preferences.

The control circuitry may be configured to assign a weight to one or more of the estimated satisfaction scores based on characteristics of the respective user and/or user preferences of that respective user. In this case, comparing the estimated satisfaction score to the reference satisfaction score may comprise comparing the weighted estimated satisfaction score to the reference satisfaction score.

The control circuitry may be configured to, in response to determining that execution of the command is not consistent with the user preferences, select a subset of the users for which the estimated satisfaction scores meet the condition, determine that the command is to be executed on the media content displayed to that subset of users, and, while playing of the media content to the subset of users is being modified, provide alternative media content to other users in the group watch session, where the other users are not in the subset.

The control circuitry may be configured to cause modifying of the playing of the portion of the media content by transmitting a message, based on the command, to one or more servers or user devices participating in the group watch session.

The control circuitry may, in response to receiving the command from one of the users, determine whether a number of commands previously received from that user during the group watch session is consistent with a second condition, and, if it is determined that the number of commands is not consistent with the second condition, not execute the command. In this manner, the apparatus may limit the number of times one of the users can modify playing of the media content.

The determination may be based on a particular type of command. For example, if the command is a rewind command, the control circuitry may determine whether the user has previously requested a particular number of operations to rewind the media content in the group viewing session.

DETAILED DESCRIPTION

Example methods and systems for providing media content in a group watch session will now be described.

Figure 1:
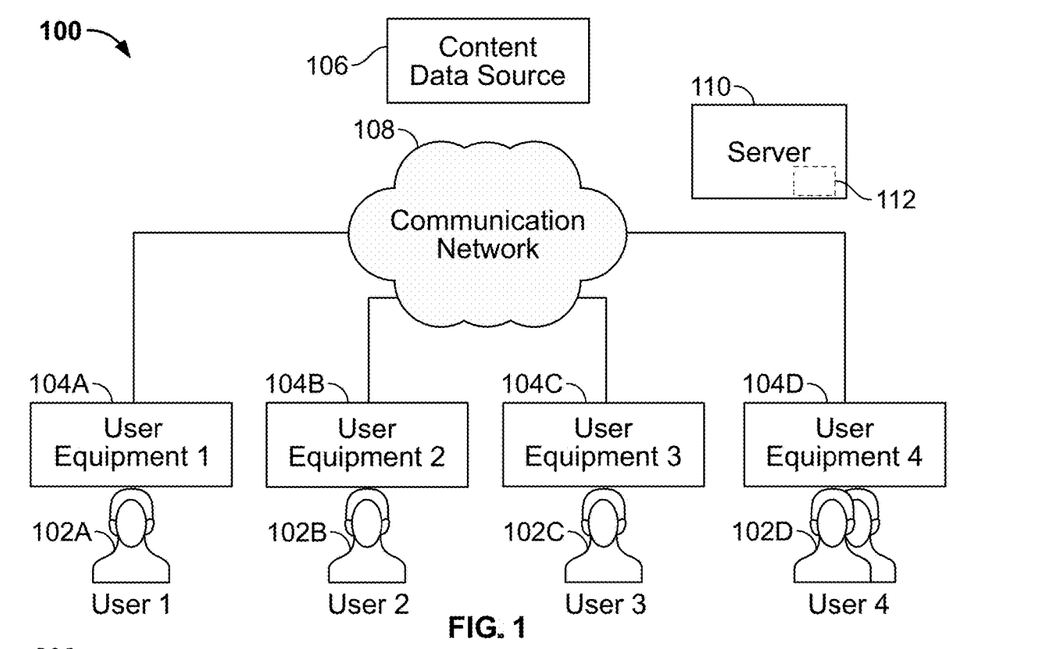
FIG. 1 depicts a system according to an embodiment.

FIG. 1 depicts an example of a system 100 for providing media content in accordance with an embodiment, in which multiple users 102a-d are watching media content on respective user equipment devices 104a-d in a group watch session. Examples of suitable user equipment devices 104a-d include, but are not limited to, a smart television, a tablet device, a smartphone, a device such as a set-top box or streaming device connected to a display device, a gaming machine, a 3D headset or virtual reality display equipment.

In the particular example shown in FIG. 1, some of the users 102a-102c have joined the group watch session from different physical locations, while multiple users 102d are at the same physical location and are participating in the group watch session using the same user equipment device 104d.

In this example, the user equipment devices 104a-d receive the same media content from a content source 106 via a communication network 108. Examples of content sources 106 include video-on-demand servers, streaming services, network digital video recorders or other devices that can communicate with the user equipment devices 104a-d via the network 108. Examples of media content include a television program, a recording of media content, streamed media content or an online video game. In this example, the communication network 108 is the Internet. In another example, the content may be provided by one of the user equipment devices 104a to the other user equipment devices 104b-104d via the communication network 108.

Although only one communications network 108 is shown in the example of FIG. 1, in other embodiments, the user equipment devices 104a-d may receive the media content via a first communication network 108 and communicate with other user equipment devices 104a-104d via a second communication network (not shown). For example, the user equipment devices 104*a-d* may receive the media content via a first communications network, such as a cable or broadcast network, and communicate with each other via a second communication network, such as the Internet.

The user equipment devices 104*a*-104*d* may also communicate with other devices and servers, such as remote server 110, via the communication network 108. For example, certain applications may be implemented on one or more of the user equipment devices 104*a*-104*d* as client-server applications, in which data is generated by control circuitry 112 in the remote server 110 and transmitted to the one or more user equipment devices 104*a*-104*d* for use in providing information, such as program guide data, or other functionality to the users 102*a*-102*d*.

Figure 2:
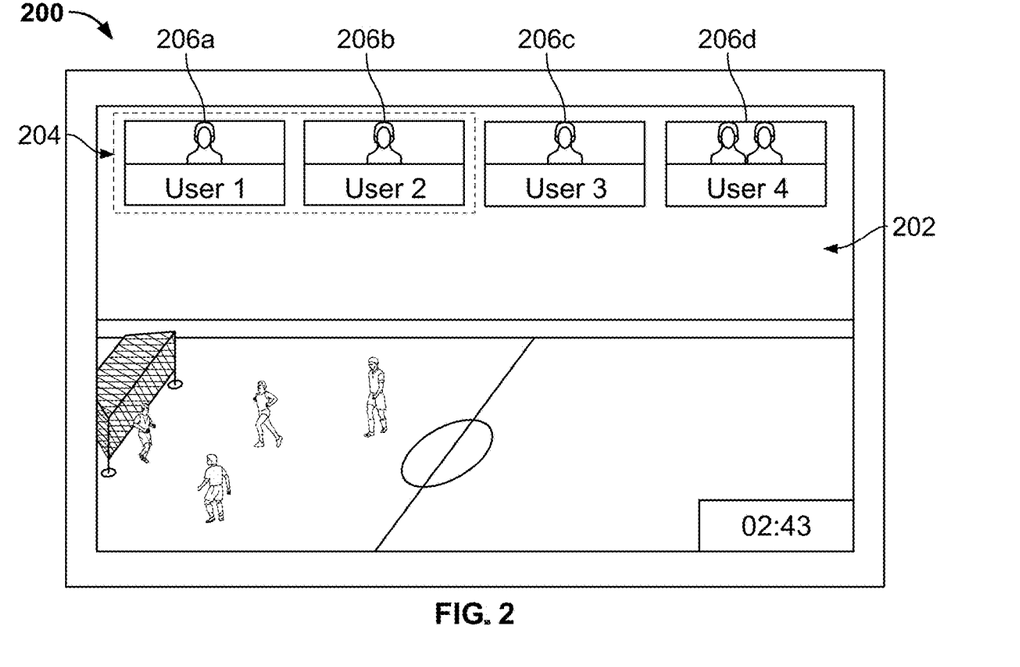
FIG. 2 depicts an example of media content provided in a group watch session in the system of FIG. 1.

FIG. 2 depicts an example of a display screen 200 presenting media content 202 to a user 102*a* in the group of users 102*a*-102*d*. Optionally, a gallery 204 of one or more videos, or still images, 206*a*-206*d* of users 102*a*-102*d* may be displayed alongside, or overlaid on a portion of, the media content 202. This allows the user 102*a* to see other users 102*b*-102*d* in the group and, where the images 206*a*-206*d* are videos, their reactions to the media content 202, to enhance the shared experience of viewing the media content 202 in the group watch session.

Figure 3:
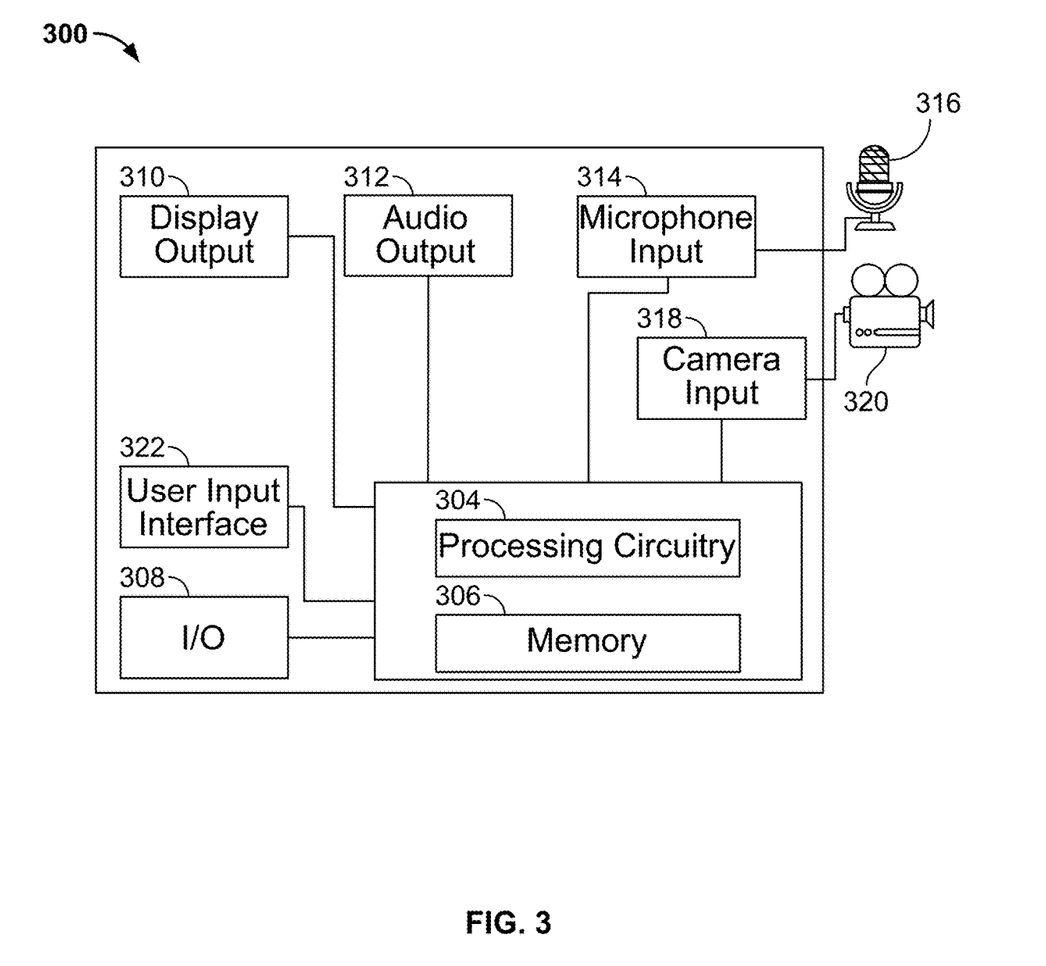
FIG. 3 depicts an example of user equipment for use in the media system of FIG. 1.

A general configuration of an exemplary user equipment device 300 for use in the system 100 is depicted in FIG. 3. The user equipment device 300 includes control circuitry 302, which comprises processing circuitry 304 and a memory 306 that stores, at least, a computer program that, when executed by the processing circuitry 304, provides a group watching application. The group watching application may be a stand-alone application or part of another application, such as a media player application.

Specifically, the control circuitry 302 may be instructed by applications to perform the functions discussed above and below. For example, applications may provide instructions to control circuitry 302 to generate displays. In some implementations, any action performed by control circuitry 302 may be based on instructions received from the applications. In some embodiments, the applications are wholly implemented on the user equipment device 300. For example, the application may be implemented as software or a set of executable instructions which may be stored in the memory 306 and executed by the control circuitry 302.

In some embodiments, the applications may be client-server applications where only a client application resides on the user equipment device 300, and a server application resides on a remote server. For example, applications may be implemented partially as a client application on the control circuitry 302 and partially on a remote server, such as server 110 shown in FIG. 1, as a server application running on control circuitry 112 of the remote server 110. When executed by the control circuitry 112 of the remote server 110, the application may instruct the control circuitry 112 of the remote server 110 to generate application displays and transmit the generated displays to the user equipment device 300. The server application may instruct the control circuitry 112 of the remote server 110 to transmit data for storage on the user equipment 300. The client application may then instruct the control circuitry 302 of the user equipment 300 to generate the application displays.

The processing circuitry 304 may be based on one or more microprocessors, microcontrollers, digital signal processors, programmable logic devices, etc. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The memory 306 may be random-access memory, read-only memory, or any other suitable memory. As referred to herein, the terms "storage" and "memory" should be understood to mean any device for storing electronic data, computer software, or firmware, such as random-access memory, read-only memory, hard drives, optical drives, or any other suitable fixed or removable storage devices, and/or any combination of the same.

The control circuitry 302 includes communications circuitry suitable for communicating with an application server, networks or servers. In a client-server arrangement, the instructions for carrying out the above-mentioned functionality may be stored on an application server. The communications circuitry may include a cable modem, an integrated services digital network (ISDN) modem, a digital subscriber line (DSL) modem, a telephone modem, Ethernet card, or a wireless modem for communications with other equipment, or any other suitable communications circuitry via the one or more communications networks 108. In addition, communications circuitry may include circuitry that enables peer-to-peer communication between the user equipment devices 102*a*-102*d*.

The control circuitry 302 is arranged to receive media content 202 via the communication network 108 through input/output path 308, and generate for output audio and/or video components of the media content 202. The I/O path 802 may connect the control circuitry 302, and, specifically, processing circuitry 304, to one or more communications networks, such as communications network 108 shown in FIG. 1. I/O functions may be provided via one or more of these communication paths but are shown as a single path in FIG. 1 to avoid overcomplicating the drawing. The I/O path 308 may thus provide content (e.g., one or more of broadcast programming, on-demand programming, Internet content, content available over a local area network (LAN) or wide area network (WAN), and/or other content) and data to control circuitry 302.

The control circuitry 302 may also send and receive commands, requests, and other suitable data using the I/O path 308. For example, the control circuitry 302 may be arranged to generate and send data to other user equipment devices 104*b-d* in the group via the input/output path 308. For example, the control circuitry 302 may send video or still images of the user of the user equipment device 300 to the other user equipment devices participating in the group watching session, as shown in FIG. 2, to enhance the experience of watching the media content with the other users.

The control circuitry 302 includes video generating circuitry and, optionally, tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment device 300. The circuitry described herein, including for example, the tuning, video generating, encoding, decoding, encrypting, decrypting, scaler, and analog/digital circuitry, may be implemented using software running on one or more general purpose or specialized processors.

The control circuitry 302 is thus arranged to provide the video component of the media content and, optionally, data received from the other user equipment devices in the group for display via display output 310. The display output 310 may be configured to be connected, via a wired or wireless connection, to an external display device, such as a television or monitor (not shown), or may be an integrated display, such as a touch-screen display. The display output 310 may be a video card or graphics card and may offer various functions such as accelerated rendering of 3D scenes and 2D graphics, MPEG-2/MPEG-4 decoding, TV output, or the ability to connect multiple monitors. The display output 310 may be any processing circuitry, such as the examples described above in relation to the processing circuitry 304. The display output 310 may be integrated with the control circuitry 302.

The control circuitry 302 is also be arranged to generate for output, via audio output 312, the audio component of the media content. The audio output 312 may be configured to be connected, via a wired or wireless connection, to an external audio output device, such as a television, monitor, speaker or headphones (not shown), and/or one or more speakers integrated into the user equipment device 300. Although the audio output 312 is shown in FIG. 3 as being separate from the display output 310, the audio output 312 and display output 310 may be provided by the same video card, graphics card or processing circuitry.

The control circuitry 302 may also be arranged to receive input from one or more sensors. In the example shown in FIG. 3, the user equipment device 300 includes a microphone input 314 that is arranged to receive audio input signals via an integrated microphone, or an external microphone 316 connected to, or otherwise in communication with, the user equipment device 300. Alternatively, or additionally, the control circuitry 302 may be arranged to receive still and/or video images, via camera input 318, from one or more cameras 320. The one or more cameras 320 may be integrated into the user equipment device 300, external cameras connected to, or otherwise in communication with, the user equipment device 300, or a combination thereof.

The user equipment device 300 also includes a user input interface 322 for receiving instructions and requests from a user, for example, to control playing and selection of media content. User input interface 322 may be any suitable user interface, such as a remote control, mouse, trackball, keypad, keyboard, touch-screen, touchpad, stylus input, joystick, voice recognition interface, or other user input interfaces. The user input interface 322 may be provided as a stand-alone device or integrated with other elements of the user equipment device 300 or a media system including the user equipment device 300. For example, the user equipment device 300 may include a display (not shown) in the form of a touch-screen or touch-sensitive display that provides the user input interface 322 for receiving user input.

Figure 4:
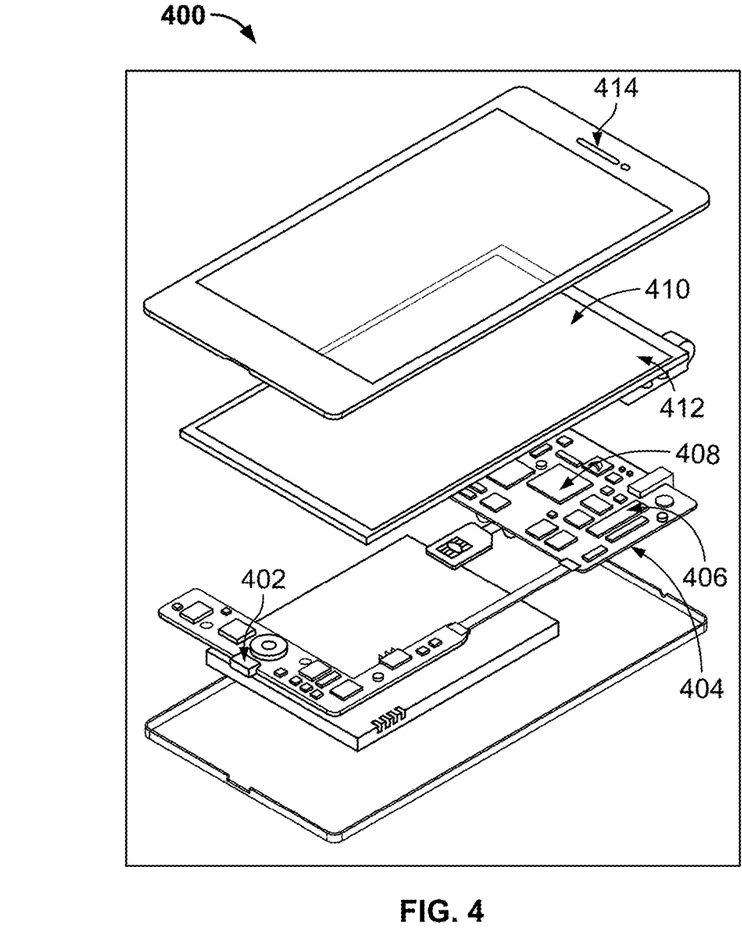
FIG. 4 depicts another example of user equipment for use in the media system of FIG. 1.

FIG. 4 depicts a specific example of a user equipment device 400 that may be used as any of the user equipment devices 104a-104d. In this particular example, user equipment device 400 is a smartphone, configured to receive content and data via I/O path 402. The I/O path 402 is configured to provide content and data to control circuitry 404, which includes processing circuitry 406 and storage 408, as described above in relation to FIG. 3.

The user equipment device 400 also includes a user input interface 410 for receiving instructions from a user, a display 412, and a microphone (not shown), as described above in relation to FIG. 3, as well as a speaker 414 for providing audio output. In this particular example, the display 412 is a touch-screen display that is a part of the user input interface 410.

Figure 5:
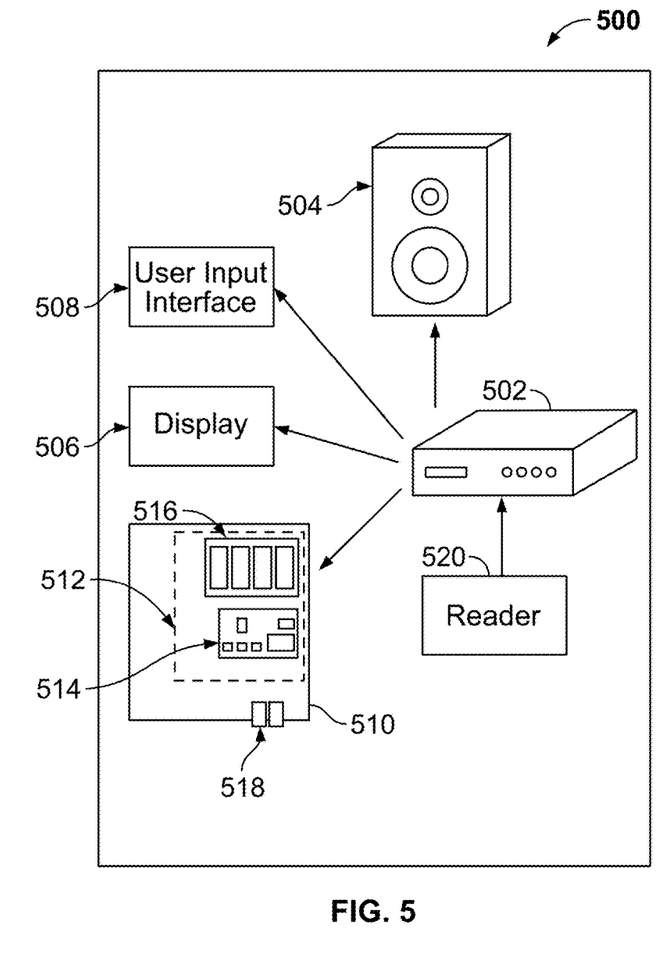
FIG. 5 depicts a media system that may be included in the system of FIG. 1.

FIG. 5 depicts an example media system 500, including another example user equipment device 502 that may be used as any of the user equipment devices 104a-104d. The media system 500 may be a user television equipment system, a gaming system, an in-vehicle entertainment system, or other type of media system.

In this example, the user equipment device 502 is a set-top box in a user television equipment system. The set-top box 502 may be communicatively connected to one or more speakers 504 and a display 506. The speakers 504 may be provided as integrated with other elements of the user equipment device 502 or media system 500 or may be stand-alone units. The audio component of videos and other content displayed on display 506 may be output through the speakers 504. In some embodiments, the audio may be distributed to a receiver, not shown, which processes and outputs the audio via external speakers 504.

The display 506 may be one or more of a monitor, a television, a liquid crystal display (LCD) or light-emitting diode (LED) display for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, the display 506 may be HDTV-capable. In some embodiments, display 506 may be a 3D display, and the interactive application and any suitable content may be displayed in 3D.

The set-top box 502 is communicatively coupled to user input interface 508. In some embodiments, user input interface 508 is a remote control device configured to communicate with the set-top box 502 to allow a user to send instructions and requests to the set-top box 502. Such a remote control device may be connected to the user equipment device 300 via a wireless connection, such as an infra-red, Wi-Fi, BLUETOOTH or other suitable connection. Alternatively, or additionally, the microphone 316 and microphone input 314 may be used to receive voice input for controlling the user equipment device 300, in which case the processing circuitry 304 may perform natural language processing to determine the user's command from the voice input and perform a corresponding action.

The set-top box 502 includes circuit board 510 that may include control circuitry 512, including processing circuitry 514, and storage (e.g., RAM, ROM, hard disk, removable disk, etc.) 516, and an I/O path 518 for receiving content and data, as described above in relation to FIG. 3.

In this particular example, the media system 500 includes a reader 520, which may be used to obtain information identifying a user 102a-102d and/or a device associated with a user 102a-102d. The reader 520 may be, for example, a near-field communication (NFC) reader that can obtain identification information from a device, such as a smartphone or a smartwatch, placed in the vicinity of the reader 520. Alternatively, or additionally, the reader 520 may obtain identification information from a card or key fob associated with the user, such as an ID card in which a suitable RFID tag, or similar, is embedded.

Figure 6:
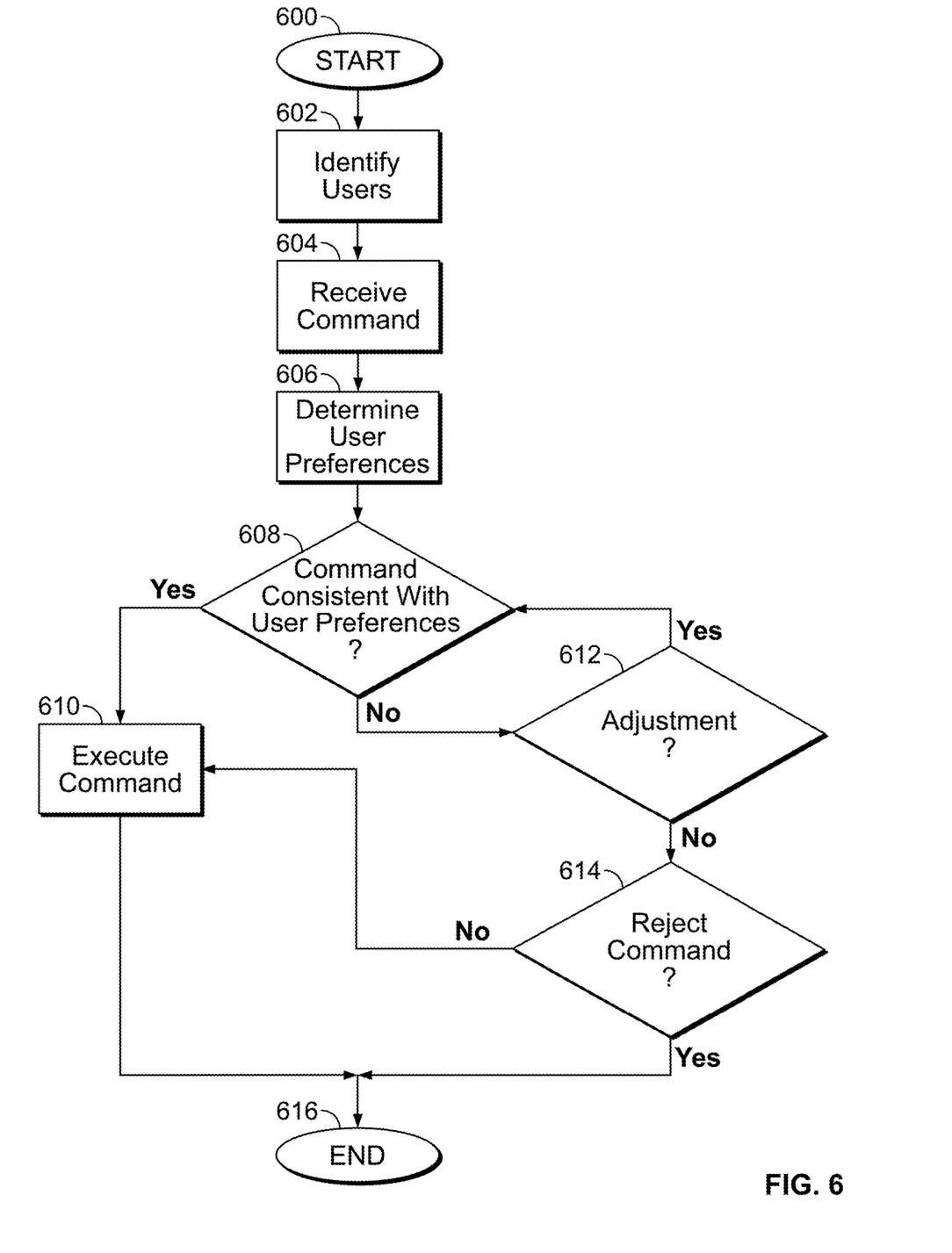
FIG. 6 is a flowchart of a process according to an embodiment.

FIG. 6 is a flowchart of a process according to an embodiment, for providing media content to multiple users. In this particular example, the process is performed by the control circuitry 302 of one of the user equipment devices 104*a*, 300. In another embodiment, the process may be performed by a combination of the control circuitry 302 of one of the user equipment devices 104*a*, 300 and the control circuitry 112 of a remote server 110. In yet another embodiment, the process may be performed by control circuitry 112 of a remote server 110.

Starting at step 600, the control circuitry 302 identifies multiple users 102*a*-102*d* participating in a group watch session (step 602). One or more techniques may be used to identify respective users 102*a*-102*d* in the group watch session. It is not necessary for the same technique to be used to identify all of the users 102*a*-102*d*. The following techniques are examples that may be used in any permutation to identify a plurality of users participating in the group watch session.

The users 102*a*-102*d* may be identified when they join an existing group watch session, for example, by providing login information to access the session. In another example, login information identifying the users 102*a*-102*d* may be obtained through the users 102*a*-102*d* accessing the session by following a personalized hyperlink provided in an e-mail or other message addressed to them or login information provided when the users 102*a*-102*d* open a group watch application or media player application.

In yet another example, one or more of the users may be identified using facial recognition. A camera 320 connected to, or otherwise in communication with, the user equipment device 104*a* may capture an image of a user 102*a* and perform facial recognition to identify the user 102*a* or, alternatively, transmit the captured image to another user equipment device 104*b*-104*d* or remote server 110 that can identify the user based on facial recognition. It is not necessary for the identification to be carried out when the user 102*a* joins, or establishes, the group watch session. For instance, the captured image may be part of the video 206*a* or still image transmitted to the other user equipment devices 104*b*-104*d* for display with the media content 202. The captured image may be used to identify multiple users. For example, an image may be captured that includes the multiple users 102*d* of user equipment device 104*d* and facial recognition used to identify both of the users 102*d*.

In a further example, one or more of the users may be identified using voice recognition. A microphone 316 connected to, or otherwise in communication with, the user equipment device 104*a* may capture an audio sample of the voice of the user 102*a* and perform voice recognition to identify the user 102*a* or, alternatively, transmit the captured audio sample to another user equipment device 104*b*-104*d* or remote server 110 that can identify the user based on their voice. It is not necessary for the identification to be carried out when the user 102*a* joins, or establishes, the group watch session. For instance, the audio sample may be captured while the user 102*a* is watching the media content 202 in the group watch session, for example, when conversing with other users 102*b*-102*d*. Where a captured audio sample includes voices of multiple users 102*d*, the voice recognition process may be used to identify those multiple users 102*d*.

In another example, one or more of the users 102*a*-102*d* may be identified based on identification information obtained from their respective user equipment device 104*a*-104*d*. For example, where a user equipment device 104*a*-104*c* is associated with a particular user, a device identifier obtained when the corresponding user 102*a*-102*c* joins the group watch session may be used to identify that user 102*a*-102*c*. Alternatively, identification information for the user or for a user equipment device associated with that user may be obtained using a reader 520, as described above in relation to FIG. 5. Such a reader 520 may be used to obtain identification information from a device associated with the user without requiring that device to be used to access the group watch session. This technique may be particularly useful where multiple users 102*d* access the group watch session from a single user equipment device 104*d*.

At step 604, a command to modify playing of the media content 202 is received from the one of the user equipment devices 104*a*-104*d*. For instance, the control circuitry 302 of the user equipment device 104*a*, 300 may receive a command to skip a portion of the media content 202 from the user 102*a* via the user input interface 322 or, in a system using voice command, via a microphone 316 and audio input 314. Optionally, the user equipment device 104*a* may forward the command to the remote server 110. Examples of commands to modify playing of the media content 202 include commands to rewind or fast-forward the media content 202, skip a portion of the media content 202, jump to a different play position in the media content 202, for example, to replay a scene in the media content 202, to stop playing the media content 202, to pause the media content 202, or to change the media content 202 being viewed. Another example command, where the media content 202 is being viewed on a broadcast, cable or Internet media channel, may be a command to change to another channel.

Although FIG. 6 depicts a process in which the users 102*a*-*d* are identified at step 602 prior to receipt of the command at step 604; in other embodiments, the users 102*a*-*d* may be identified after the command is received. This alternative process may be particularly useful in a group watch session where users are joining and/or leaving the session while the media content 202 is being played.

At step 606, user preferences of respective users in the group watching session are determined. For example, user preferences for one of the users 102*a* may be determined based on information in a user profile associated with the user 102*a*, such as a user profile for a media player application implemented on the user's user equipment device 104*a* or stored at the remote server 110, and/or based on other information about the user 102*a*, such as a social media profile, posts on social media networks and/or web forums, or e-mails, text or chat messages sent previously by the user 102*a*.

Alternatively, or additionally, the user preferences may be determined based on a viewing history of the user 102*a* stored in the user equipment device 104*a* or at the remote server 110. For example, the user's viewing history may indicate that the user 102*a* dislikes media content with certain characteristics, such as media content in a particular genre, or featuring a certain celebrity, and/or indicate the user's favorite genre, channel or actor.

User preferences may also, or instead, be determined by requesting such information from the user equipment devices 104*a*-*d* associated with the respective users 102*a*-*d*.

FIG. 6 depicts a process in which the user preferences, described with reference to step 606, are determined after the command is received at step 604. In an alternative embodiment, the user preferences may be determined before the command is received, allowing the command to be executed, or rejected, more quickly.

At step 608, it is determined whether or not the command is consistent with the determined user preferences of each of the respective users 102*a*-*d*. The determination may include estimating a satisfaction score for each of the respective users 102*a*-*d* associated with execution of the command. For example, where the media content 202 is a soccer game, and the command is an instruction from user 102*a* to switch to a news channel during the half-time interval, instead of watching sports presenters discussing the first half of the game, then the estimated satisfaction score for user 102*a* may be relatively high, based on the user's preference for news media, when compared with the estimated satisfaction score for user 102*b*, who may have preferences indicating a dislike for news media and a strong preference for sports media. Meanwhile, user 102*c* might have a similar interest in news media and sports media, leading to an estimated satisfaction score between the estimated satisfaction scores for user 102*a* and user 102*b*. Where multiple users 102*d* have been identified at one location, a satisfaction score may be estimated for each of the identified users 102*d*.

In some embodiments, the determination 608 may include weighting the estimated satisfaction scores of particular users. For example, the estimated satisfaction scores of adult users may be assigned a higher weight than the estimated satisfaction scores of child users, so that the preferences of the adult users take precedence over those of the children. Similarly, where a command is to replay a scene with quiet dialogue, an estimated satisfaction score for a user that is hard of hearing may be assigned a higher weight than those of other users whose hearing is unimpaired, so that the specific needs of that particular user are given priority over the likes/dislikes of the other users.

The estimated satisfaction score may then be compared with a reference satisfaction score. If each of the estimated satisfaction scores meets a condition based on the reference satisfaction score, then the command is determined to be consistent with the user preferences. For example, if the condition is that each of the estimated satisfaction scores must meet, or exceed, the reference satisfaction score, then the command is determined to be consistent with the user preferences.

If it is determined, at step 608, that the command is consistent with the preferences of each of the respective users 102*a*-*d*, then the command is executed (step 610).

If it is determined, at step 608, that the command is not consistent with the preferences of each of the respective users 102*a*-*d*, then the process may continue, optionally, by making an adjustment to one or more of the factors used in the determination at step 608 (step 612). For example, a value of the reference satisfaction score may be reduced, and then compared again with the user preferences at step 608. Alternatively, or additionally, a parameter relating to a portion of the media content 202 to be modified may be changed. For example, a duration of the portion to be skipped may be changed. In another example, a number of segments of the media content 202 to be skipped may be changed. In yet another example, alternative media content may be displayed in place of a portion of the media content 202 or other media content indicated by the command. For instance, where the command was an instruction to change to a news channel during the half-time discussion, the adjustment 612 to the determination may include estimating new satisfaction scores based on switching to the news channel during commercial breaks only, or switching to a different channel during the half-time discussion.

In embodiments where an adjustment is made at step 612, the adjustment may include assigning weights to previously unweighted estimated satisfaction scores or, alternatively, adjusting weights assigned previously to the estimated satisfaction scores.

If an adjustment is made at step 612, then the determination of whether the command is consistent with the user preferences at step 608 is repeated, taking the adjustment into account.

It may, however, be determined at step 612 that no adjustment is to be made (step 614). For example, the reference satisfaction score may have been reduced in one or more previous adjustments and dropped below a minimum threshold without the condition being met by all of the estimated satisfaction scores. In this case, the command may be rejected (step 614), or may be executed without the condition being met (step 610). The process then ends (step 616).

The process of FIG. 6 may include multiple iterations of adjustments (step 612) and determinations of whether the command is consistent with the user preferences, taking those adjustments into account (step 608). As noted above, such multiple adjustments may include adjustments to one or more of a value of the reference satisfaction score, weights, characteristics of a portion of the media content 202 on which the command is to be executed, such as a duration or play position within the media content 202, and characteristics of other media content that may be presented in the group watch session in place of at least a portion of the media content 202. Where multiple adjustments are made, a later adjustment may replace an earlier adjustment or, alternatively, be combined with an earlier adjustment.

An example of a process including multiple adjustments (step 612) and consistency determinations (step 608) will now be described. In this example scenario, the media content 202 is a movie with scenes that are categorized into various genres. The number of scenes in the media content 202 for five different genres is shown in Table 1.

TABLE 1

|  | Genre | | | | |
| --- | --- | --- | --- | --- | --- |
|  | Horror | Crime | Action | Drama | Musical |
| Number of scenes | 5 | 4 | 5 | 4 | 0 |

In this example, the command received at step 604 is a command to skip a set number of segments. For instance, the group watch session may have a set duration and user 104*a* may input a command to skip ten portions of the media content 202 so that the users 102*a*-*d* can finish viewing the movie before the session ends.

Table 2 sets out example user preferences for the genres, in which a user's dislike of a particular genre is indicated by an "X."

TABLE 2

|  | Horror | Crime | Action | Drama | Musical |
| --- | --- | --- | --- | --- | --- |
| User 102a | X | X |  | X | X |
| User 102b | X |  | X |  |  |
| User 102c | X |  | X |  |  |

TABLE 2-continued

|  | Horror | Crime | Action | Drama | Musical |
|---|---|---|---|---|---|
| User 102d (1) | X |  | X |  |  |
| User 102d (2) |  | X | X | X |  |

During a first iteration in process 600, satisfaction scores for each user are estimated for an initial selection of ten scenes to be skipped. In this example, the initial selection of scenes consists of 5 horror and 5 action scenes, based on the genres that have the most dislikes indicated by the user preferences in Table 2. Example satisfaction scores for each user are set out in Table 3, in the form of the percentage of scenes to be skipped that correspond with that user's dislikes.

TABLE 3

|  | Number of scenes where skipping is consistent with user preferences | Estimated satisfaction score |
|---|---|---|
| User 102a | 5 (Horror: 5) | 50% |
| User 102b | 10 (Horror: 5, Action: 5) | 100% |
| User 102c | 10 (Horror: 5, Action: 5) | 100% |
| User 102d (1) | 10 (Horror: 5, Action: 5) | 100% |
| User 102d (2) | 5 (Action: 5) | 50% |

Optionally, a list of estimated satisfaction scores may be displayed to one or more of the users 102a-d. For example, Table 3 may be generated for display by the display output 310 on the user equipment device 104a.

If the condition to be met at step 608 indicates that each estimated satisfaction score must be more than, or equal to, a reference satisfaction score of 60%, then it is determined that execution of the command on the selected scenes would not be consistent with the user preferences.

At step 612, an adjustment is made to one of the parameters discussed above. In this particular example, an adjustment is made to the selection of genres of the scenes to be skipped, by taking into account other, less common, user preferences indicated in Table 2. In this second iteration, the selected scenes to be skipped include one scene in each of the next least popular genres, crime and drama, but still include four scenes in each of the less popular horror and action genres. The estimated satisfaction scores are then updated based on the new selection of scenes, as shown in Table 4.

TABLE 4

|  | Number of scenes where skipping is consistent with user preferences | Estimated satisfaction score |
|---|---|---|
| User 102a | 6 (Horror: 4, Crime: 1, Drama: 1) | 60% |
| User 102b | 8 (Horror: 4, Action: 4) | 80% |
| User 102c | 8 (Horror: 4, Action: 4) | 80% |
| User 102d (1) | 8 (Horror: 4, Action: 4) | 80% |
| User 102d (2) | 6 (Horror: 4, Crime: 1, Drama: 1) | 60% |

As shown in Table 4, the new selection of scenes results in each of the estimated satisfaction scores meeting, or exceeding, the reference satisfaction score of 60%. Therefore, execution of the command on this new selection of scenes is determined to be consistent with the user preferences at step 608. In response to this positive determination, the command is then executed on the new selection of scenes (step 610) and the process ends (step 616).

If it was determined, at step 608, that the new selection of scenes did not meet the condition, for example, if the reference satisfaction score was 65%, then further adjustments may be made at step 612. For example, the reference satisfaction score may be reduced by 5%, in which case the condition of meeting or exceeding the reference satisfaction score would be met at step 608 in the next iteration. Alternatively, or additionally, weights may be assigned to the estimated satisfaction scores for different users, or previously assigned weights may be adjusted at step 612.

Other adjustments that may be made at step 612 include adjustments to the number of scenes to be skipped or a duration of the media content 202 to be skipped. For example, where the command received at step 604 may have specified skipping ten segments, the number of segments may be adjusted to a lower number of scenes, for example, eight scenes instead of the initial ten.

The portion of the media content 202 to be skipped may be adjusted at step 612. In the earlier example, where user 102a wished to switch to a news channel during a half-time interval in a soccer game, the adjustment may be based on switching to the news channel during a commercial break in the half-time interval but returning to the media content 202 for the discussion by the sports presenters. Alternatively, the adjustment may relate to switching to a different channel, such as sports-oriented news channel, or other media content such as a preview video for another soccer game, which may increase the estimated satisfaction scores of the other users 104b-d associated with the command.

In another example, the adjustment may be based on replacing one or more skipped scenes with other media content. For example, if the media content 202 is an episode in a series, the scenes may be skipped and media content associated with the next episode, such as a preview for the next episode or a scene from the start of the next episode, may be added to the end of the media content 202, to increase some or all of the estimated satisfaction scores.

In yet another example, where the multiple user equipment devices 104a-d are participating in the group watch session, it may be possible to find a solution that meets the condition by displaying different media content to different users 102a-d. For example, in the scenario discussed in relation to FIG. 2, the news bulletin may be displayed to user 102a, while the other users 102b-d view the half-time discussion.

However, it may not be possible to meet the condition by making yet another selection of scenes to be skipped. For instance, the only other dislike indicated in Table 2 is a dislike of musical scenes by user 102a, but this preference cannot be used to adjust the selection of scenes further because, as shown in Table 1, the media content 202 does not include a musical scene. In such a case, the process may proceed to step 614, where the command may be rejected or, alternatively, executed with an existing selection of scenes. The existing selection of scenes may be the most recent selection, or may be an earlier selection. For example, the initial selection of scenes described with reference to Table 3 may be used because it is consistent with the preferences of a majority of the users 102a-d.

Figure 7:
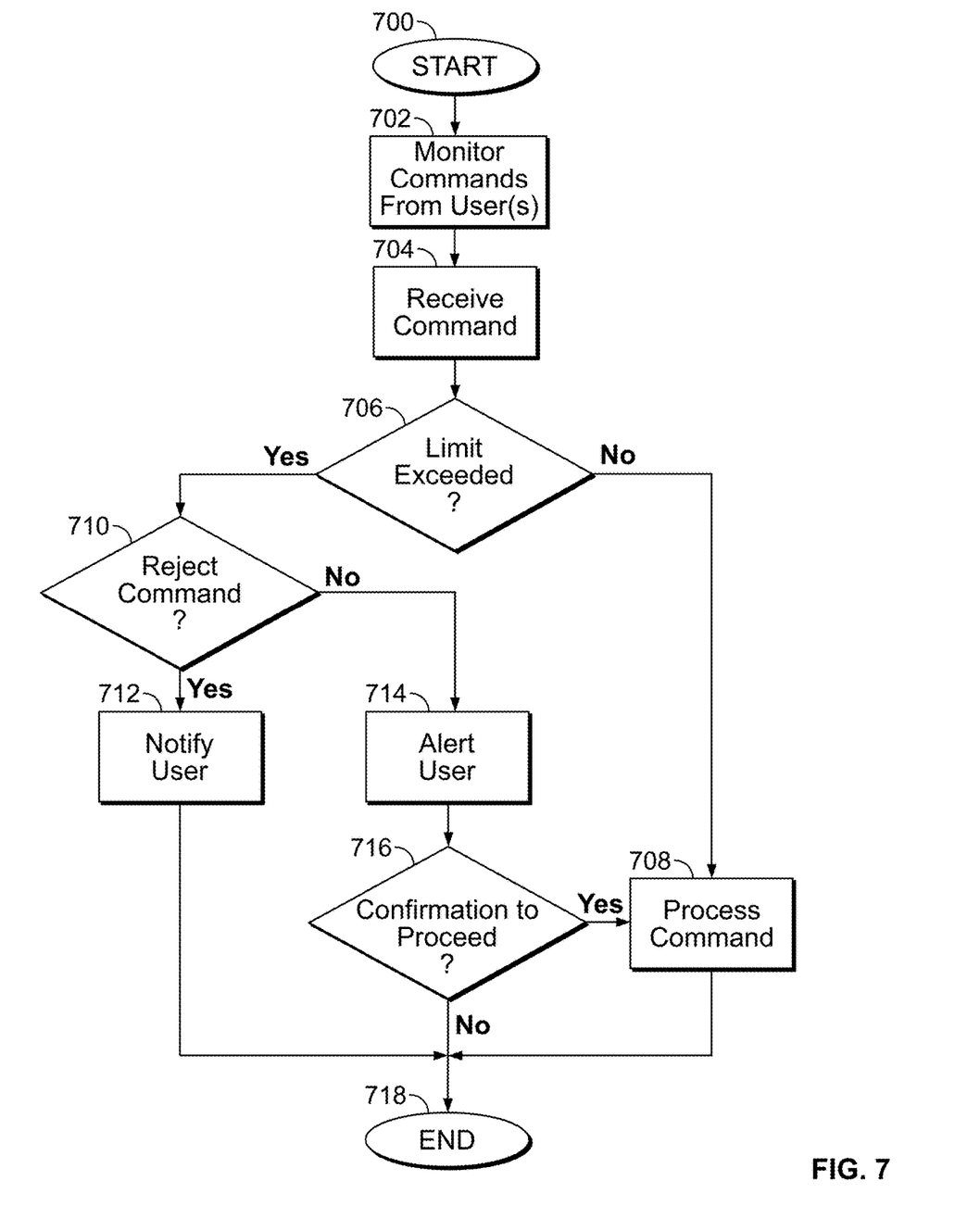
FIG. 7 is a flowchart of a process that may be included in the process of FIG. 6.

FIG. 7 depicts a process 700 that may be included as an addition to the process of FIG. 6 in an embodiment, for example, to limit the number of times any one of the users 102a-d can modify playing of the media content 202. The process 700 may be performed by control circuitry 302 of a user equipment device 300, by the control circuitry 112 of a remote server 110, or by a combination of such control circuitry 302, 112.

Starting at step 700, the commands received from one or more users 104a-d during the group watch session are monitored (step 702). For example, control circuitry 304 of user equipment device 104a may keep a record of the commands received from a user 102a, for example, by maintaining a log stored in the memory 306.

When a command is received from user 102a, for example, via the user input interface 322 or microphone 316 (step 704, corresponding to step 604 of FIG. 6), then the control circuitry 302 determines a number of times that the user 102a has already modified playing of the media content 202 in the group watch session. Where a log of the user's commands is maintained, the determination may be based on that log.

It is then determined whether the number of times the user has modified playback of the media content 202 exceeds a given limit (step 706). In some embodiments, the determination may be based on a comparison of the number of all commands received via the user input interface 322 and/or microphone 316 to modify playing of the media content 202 with the limit. In other embodiments, the determination may take into account the type of command (e.g., skip, rewind, fast-forward, pause, jump to another play position, change media content or change channel) received at step 704 by comparing a number of times the user 102a has input that particular type of command with a specific limit for that type of command.

If it is determined that the user has not exceeded the relevant limit at step 706, then the command is then processed (step 708), for example, by proceeding to step 608 in FIG. 6.

If it is determined that the user has met or exceeded the relevant limit at step 706, then, optionally, the command may be rejected outright (step 710) and the user notified accordingly (step 712), for example, by displaying a message via the display output 310 or outputting an audio alert via a speaker 414. For instance, the command may be rejected at step 710 if the number of the times indicates that the user 102a has continued attempting to modify playing of the media content 202 after exceeding the relevant limit.

Optionally, instead of rejecting the command outright (step 710), the system may alert the user that they have exceeded a limit for modifying playing of the media content 202 in the group watch session (step 714), for example, by displaying a message via the display output 310 or an audio alert via a speaker 414, to give the user 104a an opportunity to confirm whether they wish to proceed with the command. If confirmation to proceed is received (step 716), for example, via the user input interface 322 or microphone 316, then the command is processed (step 708), for example, by proceeding to step 608 in FIG. 6.

By providing an option for the user to confirm that the command should proceed (step 716), the process 700 allows for special circumstances in which repeated modification of the playing of the media content 202 may be acceptable to the other users 102b-d. For example, if the users 102a-d are discussing a particular incident in the soccer match shown in the media content 202 of FIG. 2, the other users 102b-d may be amenable to the user 102a replaying a segment of the media asset containing the particular incident multiple times.

The process 700 ends at step 718.

The process 700 can be used to reduce a risk that a particular user 102a might impair the other users' enjoyment by repeatedly modifying the media content. For example, if a particular user 102a replays a particular scene in the media content 202 multiple times, this may irritate the other users 102b-d, particularly if it is a scene that they dislike. By preventing the users 102a-d from modifying the playing of the media content excessively, the overall satisfaction of the group of users participating in the group watch session may be preserved.

The above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted that the systems and/or methods described above may be applied to, or used in accordance with, other systems and/or methods.

What is claimed is:

1. A method comprising:
   identifying, using control circuitry, a plurality of users participating in a group watch session;
   receiving, using the control circuitry, a command from a user equipment device associated with one of the users to modify playing of media content in the group watch session;
   determining, using the control circuitry, user preferences of respective ones of the plurality of users;
   determining, using the control circuitry, whether execution of the command is consistent with the user preferences of each of the respective users comprising:
      estimating, for each of the respective users, a satisfaction score for the command based on the user preferences,
      comparing the estimated satisfaction scores with a reference satisfaction score, and
      if the estimated satisfaction scores meet a condition based on the reference satisfaction score, determining that the execution of the command is consistent with the respective user preferences; and
   in response to determining that execution of the command is consistent with the user preferences, causing, using the control circuitry, modification of the playing of at least a portion of the media content based on the received command.

2. The method of claim 1, wherein identifying the plurality of users comprises at least one of:
   capturing an image of at least one of the users and performing a facial recognition process on the captured image;
   capturing an audio sample of a voice of at least one of the users and performing a voice recognition process on the captured audio sample;
   obtaining login information for one or more of the users; or
   obtaining identification information from a device associated with one of the users.

3. The method of claim 2, wherein the identification information is obtained from the user device via a near field communication reader.

4. The method of claim 1, wherein determining whether execution of the command is consistent with the user preferences further comprises, in response to determining that execution of the command is not consistent with the user preferences:
   adjusting a value of the reference satisfaction score;
   comparing the estimated satisfaction scores with the adjusted reference satisfaction score; and
   in response to determining that the estimated satisfaction scores meet a condition based on the adjusted reference satisfaction score, determining that the execution of the command is consistent with the user preferences.

5. The method of claim 1, wherein determining whether execution of the command is consistent with the user preferences further comprises, in response to determining that execution of the command is not consistent with the user preferences:
adjusting a parameter corresponding to a duration of the media content that will be affected by the execution of the command;
updating the estimated satisfaction score for each of the users based on the user preferences and the adjusted parameter;
comparing the updated satisfaction scores with the reference satisfaction score; and
in response to determining that each of the updated satisfaction scores meet a condition based on the reference satisfaction score, determining that the execution of the command based on the adjusted parameter is consistent with the user preferences.

6. The method of claim 1, wherein determining whether execution of the command is consistent with the user preferences further comprises, in response to determining that execution of the command is not consistent with the user preferences:
adjusting a parameter corresponding to a number of portions of the media content that will be affected by the execution of the command;
updating the estimated satisfaction score for each of the respective users based on the user preferences and the adjusted parameter;
comparing the updated satisfaction scores with the reference satisfaction score; and
in response to determining that each of the updated satisfaction scores meet a condition based on the reference satisfaction score, determining that the execution of the command based on the adjusted parameter is consistent with the user preferences.

7. The method of claim 1, further comprising assigning a weight to one or more of the estimated satisfaction scores based on characteristics of the respective user and/or user preferences of that respective user, wherein comparing the estimated satisfaction score to the reference satisfaction score comprises comparing the weighted estimated satisfaction score to the reference satisfaction score.

8. The method of claim 1, wherein determining whether execution of the command is consistent with the user preferences further comprises, in response to determining that execution of the command is not consistent with the user preferences:
selecting a subset of the respective users for which the estimated satisfaction score meets the condition;
determining that the command is to be executed on the media content displayed to that subset of users; and
while playing of the media content to the subset of users is being modified, providing alternative media content to other users in the group watch session, wherein the other users are not in the subset.

9. A non-transitory computer-readable medium on which is stored:
computer-readable instructions for identifying, using control circuitry, a plurality of users participating in a group watch session;
computer-readable instructions for receiving, using the control circuitry, a command from a user equipment device associated with one of the users to modify playing of media content in the group watch session;
computer-readable instructions for determining user preferences of respective ones of the users;
computer-readable instructions for determining whether execution of the command is consistent with the user preferences of each of the respective users comprising:
computer-readable instructions for estimating, for each of the respective users, a satisfaction score for the command based on the user preferences,
computer-readable instructions for comparing the estimated satisfaction scores with a reference satisfaction score, and
if the estimated satisfaction scores meet a condition based on the reference satisfaction score, computer-readable instructions for determining that the execution of the command is consistent with the respective user preferences; and
computer-readable instructions for, in response to determining that execution of the command is consistent with the user preferences, cause modifying playing of at least a portion of the media content based on the received command.

10. An apparatus comprising control circuitry configured to:
identify a plurality of users participating in a group watch session;
receive, using the control circuitry, a command from a user equipment device associated with one of the users to modify playing of media content in the group watch session;
determine user preferences of respective ones of the users;
determine whether execution of the command is consistent with the user preferences of each of the respective users, wherein the control circuitry is further configured to determine whether execution of the command is consistent with the user preferences by:
estimating, for each of the respective users, a satisfaction score for the command based on the user preferences,
comparing the estimated satisfaction scores with a reference satisfaction score, and
determining that the execution of the command is consistent with the user preferences based on the estimated satisfaction scores meeting a condition based on the reference satisfaction score; and
in response to determining that execution of the command is consistent with the user preferences, cause modification of the playing of at least a portion of the media content based on the received command.

11. The apparatus of claim 10, wherein the control circuitry is further configured to identify a user in the group watch session using at least one of:
facial recognition on a captured image of at least one of the users;
voice recognition on a captured audio sample of a voice of at least one of the users;
obtaining login information identifying the users; or
obtaining identification information from a device associated with one of the users.

12. The apparatus of claim 11, wherein the control circuitry is further configured to receive the identification information from a near field communication reader.

13. The apparatus of claim 10, wherein the control circuitry is further configured to, when determining whether execution of the command is consistent with the user preferences:

adjust a value of the reference satisfaction score in response to determining that execution of the command is not consistent with the user preferences;
compare the estimated satisfaction scores with the adjusted reference satisfaction score; and
in response to determining that the estimated satisfaction scores meet a condition based on the adjusted reference satisfaction score, determine that the execution of the command is consistent with the user preferences.

14. The apparatus of claim 10, wherein the control circuitry is further configured to, when determining whether execution of the command is consistent with the user preferences:
in response to determining that execution of the command is not consistent with the user preferences, adjust a parameter corresponding to a duration of the media content that will be affected by the execution of the command;
update the estimated satisfaction score for each of the respective users based on the user preferences and the adjusted parameter;
compare the updated satisfaction scores with the reference satisfaction score; and
in response to determining that the updated satisfaction scores meet a condition based on the reference satisfaction score, determine that the execution of the command based on the adjusted parameter is consistent with the user preferences.

15. The apparatus of claim 10, wherein the control circuitry is further configured to, when determining whether execution of the command is consistent with the user preferences:
in response to determining that execution of the command is not consistent with the user preferences, adjust a parameter corresponding to a number of portions of the media content that will be affected by the execution of the command;
update the estimated satisfaction score for each of the respective users based on the user preferences and the adjusted parameter;
compare the updated satisfaction scores with the reference satisfaction score; and
in response to determining that the updated satisfaction scores meet a condition based on the reference satisfaction score, determine that the execution of the command based on the adjusted parameter is consistent with the user preferences.

16. The apparatus of claim 10, wherein the control circuitry is further configured to:
assign a weight to one or more of the estimated satisfaction scores based on characteristics of the respective user and/or the user preferences of that respective user;
wherein comparing the estimated satisfaction score to the reference satisfaction score comprises comparing the weighted estimated satisfaction score to the reference satisfaction score.

17. The apparatus of claim 10, wherein the control circuitry is further configure to, when determining whether execution of the command is consistent with the user preferences:
in response to determining that execution of the command is not consistent with the user preferences, select a subset of the users for which the estimated satisfaction scores meet the condition;
determine that the command is to be executed on the media content displayed to that subset of users; and
while playing of the media content to the subset of users is being modified, provide alternative media content to other users in the group watch session, wherein the other users are not in the subset.

18. The apparatus of claim 10, wherein the control circuitry is further configured to, in response to receiving the command from one of the users, determine whether a number of commands previously received from that user during the group watch session is consistent with a second condition, and, in response to determining that the number of commands is not consistent with the second condition, refrain from executing the command.

* * * * *